United States Patent
Kumar et al.

(10) Patent No.: US 6,247,094 B1
(45) Date of Patent: *Jun. 12, 2001

(54) CACHE MEMORY ARCHITECTURE WITH ON-CHIP TAG ARRAY AND OFF-CHIP DATA ARRAY

(75) Inventors: Harsh Kumar, Freemont; Gunjeet D. Baweja, Sunnyvale; Cheng-Feng Chang, Cupertino; Tim W. Chan, San Jose, all of CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/996,110

(22) Filed: Dec. 22, 1997

(51) Int. Cl.[7] .................................................. G06F 12/00
(52) U.S. Cl. ................................................. 711/3; 711/118
(58) Field of Search ................................................ 711/3, 118

(56) References Cited

U.S. PATENT DOCUMENTS

| | | | |
|---|---|---|---|
| 5,392,410 | * 2/1995 | Liu | 711/3 |
| 5,548,742 | 8/1996 | Wang et al. | 295/455 |
| 5,634,027 | * 5/1997 | Saito | 711/3 |
| 5,802,576 | * 9/1998 | Tzeng et al. | |

* cited by examiner

Primary Examiner—Jack A. Lane
(74) Attorney, Agent, or Firm—Blakely, Sokoloff, Taylor & Zafman LLP

(57) ABSTRACT

The present invention provides an improved cache memory architecture with way prediction. The improved architecture entails placing the address tag array of a cache memory on the central processing unit core (i.e. the microprocessor chip), while the cache data array remains off the microprocessor chip. In addition, a way predictor is provided in conjunction with the improved memory cache architecture to increase the overall performance of the cache memory system.

17 Claims, 6 Drawing Sheets

CACHE MEMORY ARCHITECTURE WITH ON-CHIP TAG ARRAY AND OFF-CHIP DATA ARRAY

BACKGROUND OF THE INVENTION

1. Field of the Invention

This invention relates generally to the field of data processing systems, and, more particularly, to cache memory used in data processing systems. Specifically, the present invention relates to a cache memory architecture with way prediction.

2. Description of the Related Art

The demand for quicker and more powerful personal computers has led to many technological advances in the computer industry, including the development of faster memories. Historically, the performance of a personal computer has been directly linked to the efficiency by which data can be accessed from memory, often referred to as the memory access time. Generally, the performance of a central processing unit (CPU or microprocessor), which functions at a high speed, has been hindered by slow memory access times. Therefore, to expedite the access to main memory data, cache memories have been developed for storing frequently used information.

A cache is a relatively small high-speed memory that is used to hold the contents of the most recently utilized blocks of main storage. A cache bridges the gap between fast processor cycle time and slow memory access time. Using this very fast memory, the microprocessor can reduce the number of wait states that are interposed during memory accesses. When the processor issues the load instructions to the cache, the cache checks its contents to determine if the data is present. If the data is already present in the cache (termed a "hit"), the data is forwarded to the CPU with practically no wait. If, however, the data is not present (termed a "miss"), the cache must retrieve the data from a slower, secondary memory source, which may be the main memory or another cache, in a multi-level cache memory system. In addition, the retrieved information is also copied (i.e. stored) into the cache memory so that it is readily available to the microprocessor for future use.

Most cache memories have a similar physical structure. Caches generally have two major subsystems, a tag subsystem (also referred to as a cache tag array) and memory subsystem (also known as cache data array). A tag subsystem holds the addresses and determines where there is a match for a requested datum, and a memory subsystem stores and delivers the data upon request. Thus, typically, each tag entry is associated with a data array entry, where each tag entry stores index information relating to each data array entry. Some data processing systems have several cache memories (i.e. a multi-level cache system), in which case, each data array will have a corresponding tag array to store addresses.

Utilizing a multi-level cache memory system can generally improve the proficiency of a central processing unit. In a multi-level cache infrastructure, a series of caches can be linked together, where each cache is accessed serially by the microprocessor. For example, in a three-level cache system, the microprocessor will first access the L0 cache for data, and in case of a miss, it will access cache L1. If L1 does not contain the data, it will access the L2 cache before accessing the main memory. Since caches are typically smaller and faster than the main memory, the general trend is to design modern day computers using a multi-level cache system.

To further improve the performance of a central processing unit, computer architects developed the concept of pipelines for parallel processing. The first step in achieving parallel processing is to decompose the process at hand into stages. Typically, a computer executes all the stages of the process serially. This means that the execution of all the stages of the process must be complete before the next process is begun. A computer often executes the same staged process many times in succession. Rather than simply executing each staged process serially, the microprocessor can speed up the processing through pipelining, in which the stages of the repeating process are overlapped.

The concept of pipelining has now extended to memory caches as well. Pipelines can enhance the throughput of a cache memory system, where the throughput is defined as the number of cache memory access operations that can be performed in any one time period. Because caches are typically accessed serially, and can be decomposed into stages, it is possible to use pipelines to speed up the accessing process. In fact, modem data processing systems achieve even greater efficiency by applying the art of pipelining to multi-level cache memory systems.

An example of a two-level pipelined cache system is illustrated in FIG. 1, which stylistically depicts the L1 and L2 cache stages 5–30 of the Intel Pentium® Pro System Architecture. It takes three stages 5, 10, and 15 to complete an access of the L1 cache (not shown), and three additional stages 20, 25, and 30 to complete an access of the L2 cache (not shown). Each stage takes one cycle to complete. In the first stage 5, when a request for a load or store is issued, the address is provided to the L1 cache (not shown). During the second and the third stages 10, 15, the lookup takes place and, in case of a hit, the data transfer occurs. If the access is a miss in the L1 cache (not shown), then the request enters the fourth stage 20, where the address is submitted to the L2 cache (not shown). During the fifth stage 25, the lookup takes place and, if a hit, the data is transferred during the sixth stage 30. In summary, a load request that hits the L1 cache (not shown) completes in three clocks, while one that misses the L1 cache (not shown) but hits the L2 cache (not shown) completes in six clocks. If the load request misses the L2 cache (not shown), then the request is forwarded to the main memory (not shown).

FIG. 2 is a timing diagram illustrating an example of the Intel Pentium® Pro Architecture's two-stage pipelined cache being accessed by the microprocessor (not shown). As illustrated in the figure, the microprocessor (not shown) makes four different cache accesses (i.e. requests) 32–35. The first access 32 results in an L1 cache hit and, as a result, the request is completed within three stages. The second access 33, however, misses in the L1 cache (not shown), and the request is then forwarded to the L2 cache (not shown). Thus, it takes six stages to retrieve data from the L2 cache (not shown). Because the L1 and L2 caches (not shown) are pipelined, the first and the second accesses 32 and 33 complete in a total of seven clock cycles. However, in a non-pipelined cache system (not shown), this process would require nine clock cycles, because the L1 access would have to complete before the L2 access initiates. That is, the earliest the second access can initiate is during the fourth clock cycle, and not the during the second clock cycle, as it does in a pipelined cache system. The third and fourth accesses 34 and 35 are shown only to further illustrate how pipelined caches can improve the throughput of cache memories by processing multiple requests simultaneously.

As the number of levels in a multi-level pipelined cache memory system have increased, so have the number of pipeline stages required to support the added levels. Generally, the number of pipeline stages required to support a cache memory is proportional to the number of clock cycles required to access that memory. For a given frequency, a pipeline with more stages requires more circuitry, which not only adds to the expense of implementing pipelines, but also hinders performance and consumes additional power. It is therefore desirable to have a cache memory architecture that reduces the required number of pipeline stages, yet achieves equal or better performance.

In a multi-level cache system, it is not uncommon to find level-one, or even level-two caches on the same silicon die as the microprocessor core. To enhance the system performance, it is often desirable to fit the maximum possible cache memories on the CPU core itself. When the cache is on the CPU core, the microprocessor can directly access the cache without the additional step of accessing an external bus. However, because the CPU core is of a limited size, and because cache memories require large amounts of space, it is impractical to include more than one or two caches on the CPU core. Thus, there is a need for an improved cache architecture which offers a faster access to the cache, yet does not demand a large estate on the CPU core.

One solution the prior art has to offer to the above problem is the use of a dedicated bus, which couples a cache on the CPU core to one that resides off the core. In the Intel Pentium® Pro Processor, for example, the level-one cache, L1, resides on the microprocessor core, while the level-two cache, L2, resides on a separate die. The L1 cache has a dedicated bus, sometimes referred to as the backside bus, directly coupled to the L2 cache for quick access. But even utilizing a dedicated bus in certain circumstances has several disadvantages. First, accessing the remote cache will take longer because the information has to first be placed on, and later retrieved from, the backside bus. And second, controlling the input and output pins of the external bus consumes additional power.

The present invention is directed to overcoming, or at least reducing the effects of, one or more of the problems set forth above.

SUMMARY OF THE INVENTION

In one aspect of the present invention, a method is provided for accessing a cache memory of a data processing system, the data processing system including an external data array and a central processing unit core having a tag array and being connected to the external data array. The method includes storing cache data in the external data array and storing the index information in a tag array entry related to the cache data in the external data array.

In another aspect of the instant invention, a method for accessing a cache memory of a data processing system, the data processing system including an external data array and a central processing unit core having a way predictor and a tag array that is connected to the external data array. The method includes providing an address to a way predictor and predicting whether the address corresponds to the cache data in the external data array.

Yet in another aspect of the invention, a central processing unit core includes an interface adapted to connect with an external data array having data entries and a tag array having a plurality of tag entries corresponding to data entries of the external data array.

BRIEF DESCRIPTION OF THE DRAWINGS

Other objects and advantages of the invention will become apparent upon reading the following detailed description and upon reference to the drawings in which.

Figure 1:
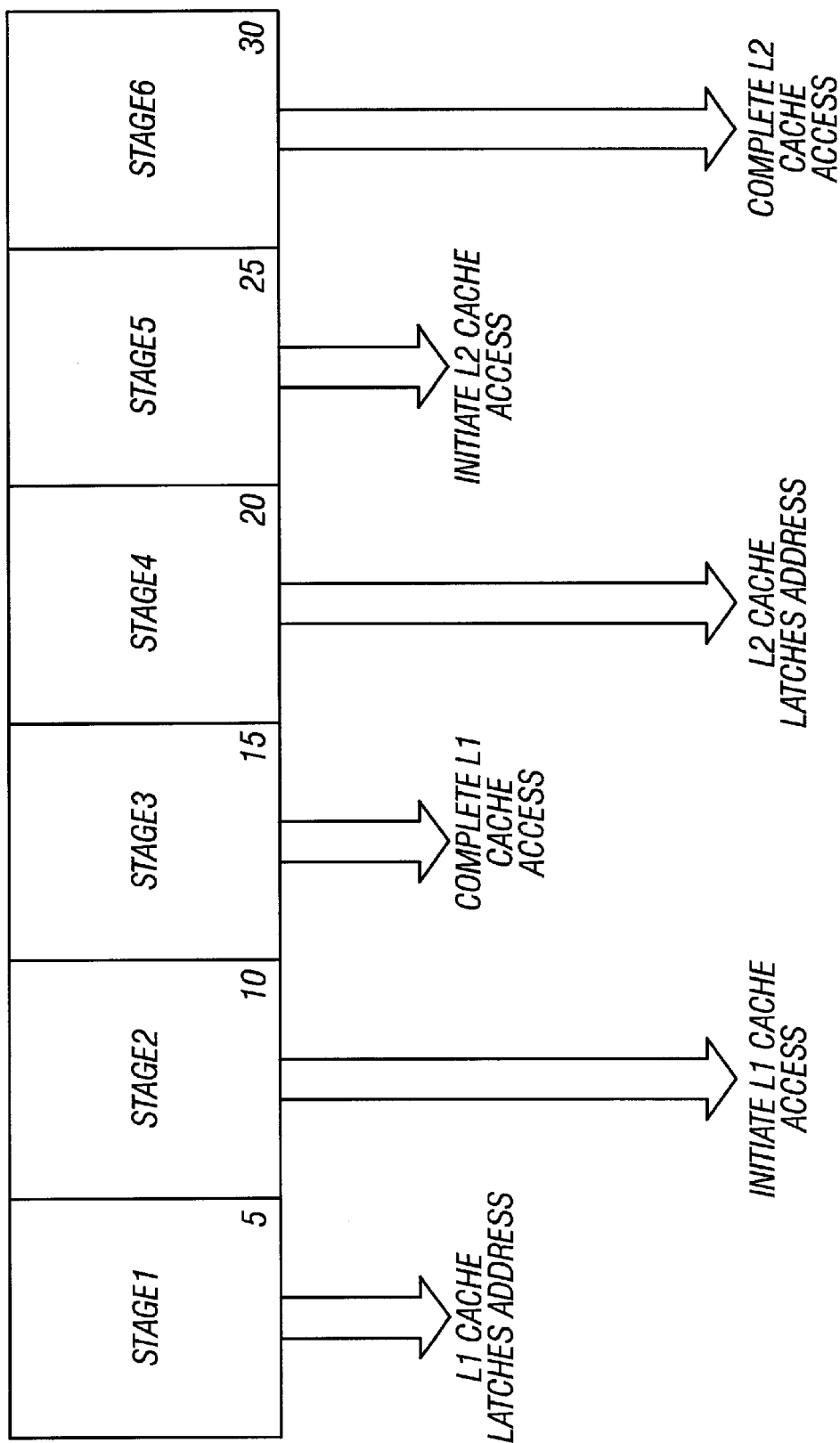
FIG. 1 is an illustration of the L1 and L2 pipelined cache stages of the Intel Pentium® Pro System Architecture.
Figure 2:
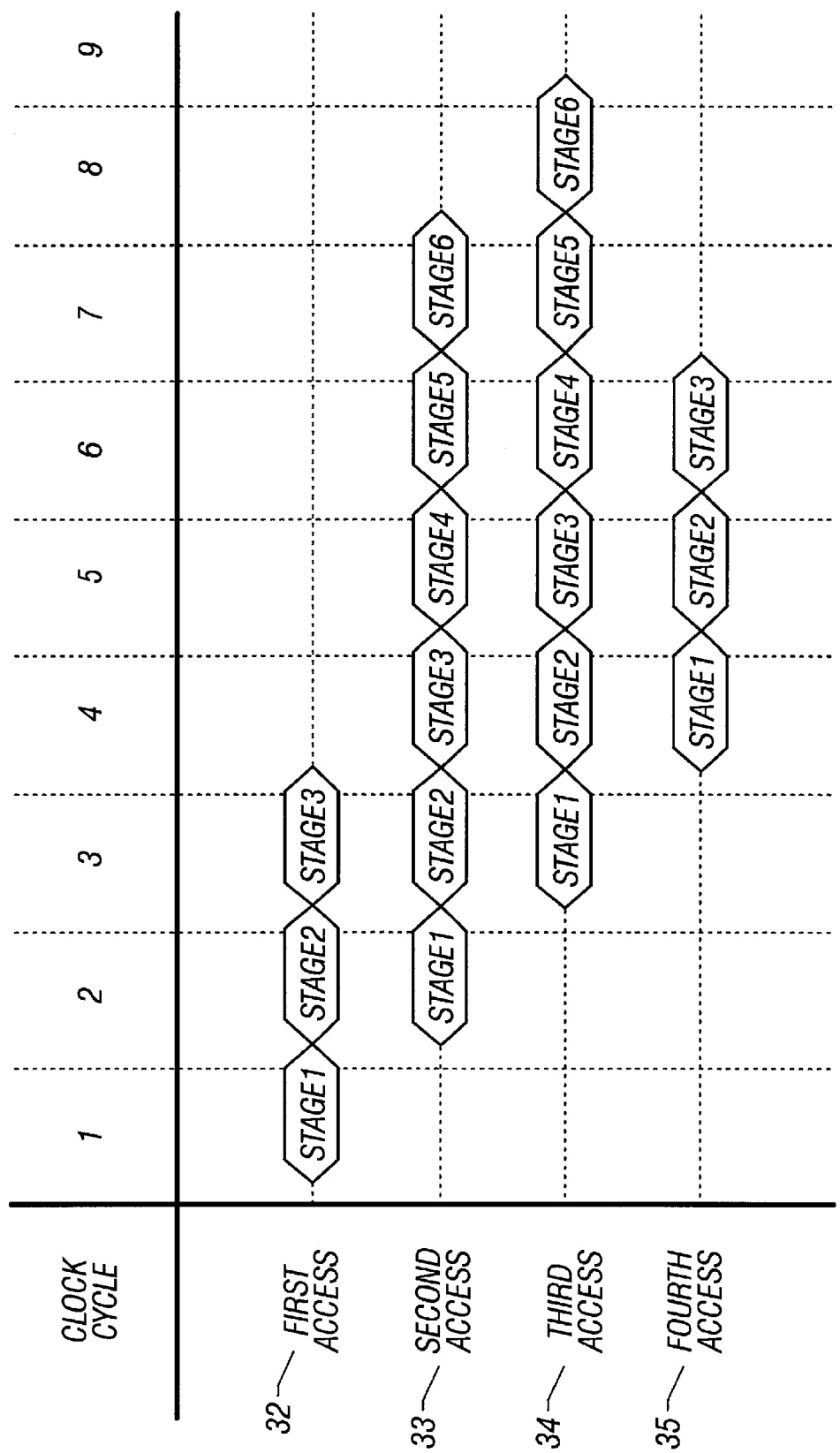
FIG. 2 is a timing diagram of the Intel Pentium® Pro Architecture's two-state pipelined cache system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Overview

The present invention provides an improved cache memory architecture with way prediction. The improved architecture entails placing the address tag array of a cache memory on the central processing unit core (i.e. the microprocessor chip), while the cache data array remains off the microprocessor chip. Several benefits are gained by having the address tag array resident on the CPU core, such as lower latency, less circuitry, less power consumption, larger data array size, and faster front side snooping. In addition, latency can be further reduced by utilizing a way predictor in conjunction with the improved memory cache architecture. The way predictor can fetch data from the data array even before the address tag array reports a hit or a miss, thereby improving the overall efficiency of the cache memory architecture.

Figure 3:
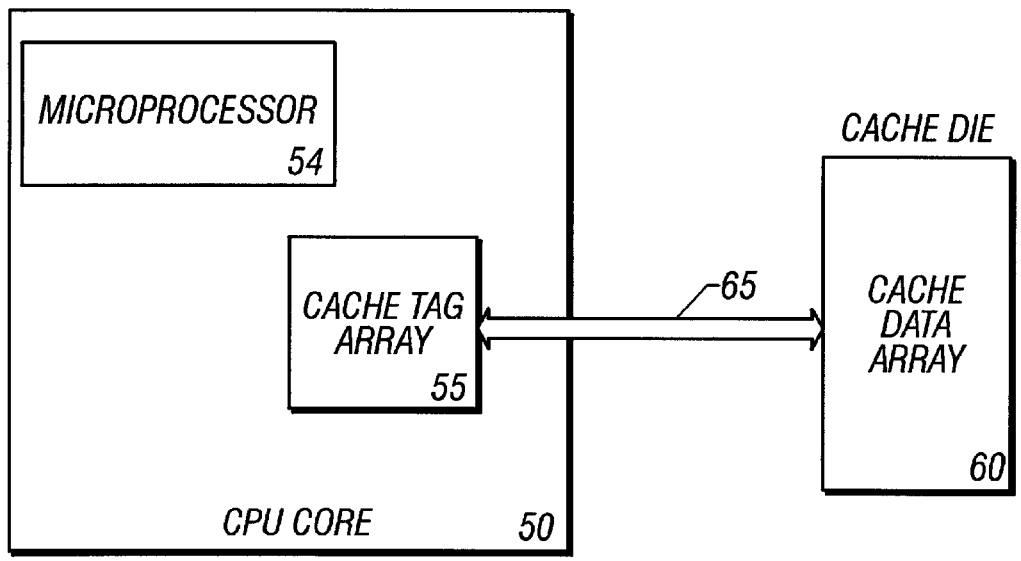
FIG. 3 is a block diagram of a cache memory architecture in accordance with the method and system of the present invention.

With reference now to the figures, and in particular to FIG. 3, there is an illustration of the cache memory architecture in accordance with the method and system of the present invention. As depicted, a cache tag array 55 and a microprocessor reside on a central processing unit (CPU) core (i.e. the microprocessor chip) 50. The cache tag array 55 is coupled to a cache data array 60 by a backside bus 65, where the cache data array 60 resides off the CPU core 50. The off-chip cache data array 60 is also referred to as an external data array.

The CPU core 50 typically houses components such as the microprocessor 55, controllers (not shown), cache memories, or the like. To improve performance, it is often desirable to have components such as the cache memories, for example, directly residing on the CPU core. But because the limited size of the CPU core can only accommodate a small number of cache memories, the present invention offers a method and apparatus of allowing fast access to caches without the need of having the entire cache housed on the CPU core.

As illustrated in FIG. 3, and in accordance with the method and system of the present invention, the cache tag array 55 is transferred to the CPU core 50, leaving the corresponding data array 60 off the CPU core 50. The CPU core 50 has an interface (not shown) comprising data pins that is adapted to connect to the external data array 60. There are several advantages derived from cache architecture of the present invention, such as reduced latency, less circuitry, less power consumption, and larger off-chip cache data array.

The cache latency is reduced because fewer number of clock cycles are required for a cache lookup. There is, however, higher latency associated with accessing information from caches not resident on the CPU core than on the CPU core. Accessing caches off the CPU core requires information to be sent and retrieved from the backside bus, which can be time consuming. During a lookup, the microprocessor 54 can directly access the cache tag array 55 without accessing the external bus 65. If a cache miss occurs, the request can be immediately forwarded to the main memory. Thus, by eliminating the need of accessing the external bus, the present invention reduces the cache latency.

The cache architecture disclosed in the present invention requires less circuitry and power. A cache tag array residing off the CPU core would ordinarily require circuitry, such as address lines and input/output pins, to address the off-chip tag array. However, with the cache tag array now resident on the chip, the need for such routing is eliminated. Under the cache memory architecture of the present invention, only the information required to identify a particular data entry in the off-chip data array, such as a set or way signal, for example, is transmitted to the external data array. This means that fewer pins are needed to access the data array residing on the cache die. Fewer pins mean less power consumption. Switching the backside input/output driver consumes more power than switching an internal signal. This is primarily due to the load difference driven by the backside signal versus an internal signal. Overall, the method and apparatus of the present invention reduces cache latency over that of prior systems that have both the cache tag and data array located off the CPU core.

Another advantage gained by the present invention is that it allows for a larger off-chip cache data array. Generally, caches not resident on the CPU core reside on a cache die. Cache dies are of limited size because of the limitations in the manufacturing process and because it is not economically feasible to produce large cache dies. The cache tag array consumes a significant area on the die, leaving the remaining area for the cache data array. But if the cache tag array is moved to the CPU core, as is the case in the present invention, then the freed space can be utilized to store data. Thus, the present invention allows for a larger off-chip cache data array.

Those skilled in the art will appreciate that the method and apparatus of the present invention is equally applicable to any number of levels of caches and to any variety of cache A systems. Although FIG. 3 illustrates only one level of caching, the present invention is adaptable to a multi-level cache system as well. For example, in a two-level cache system, the first cache could be resident on the CPU core in its entirety, while the combination of the cache tag array 55 (on-chip) and cache data array 60 (off-chip) depicted in FIG. 3 would serve as a secondary cache. It is well-known in the art that caches come in a variety of forms, including direct-mapped, associative, set-associative, and sector. Each of the above forms can be an instruction cache, a data cache, or an unified cache. These various cache systems, regardless of whether they store data, instruction, or both, differ only in the form in which information from the main memory is mapped into the cache. Thus, it should be understood that the method and apparatus of the present invention is not limited to any one particular cache system, and, instead, is equally applicable to other cache systems as well.

Figure 4:
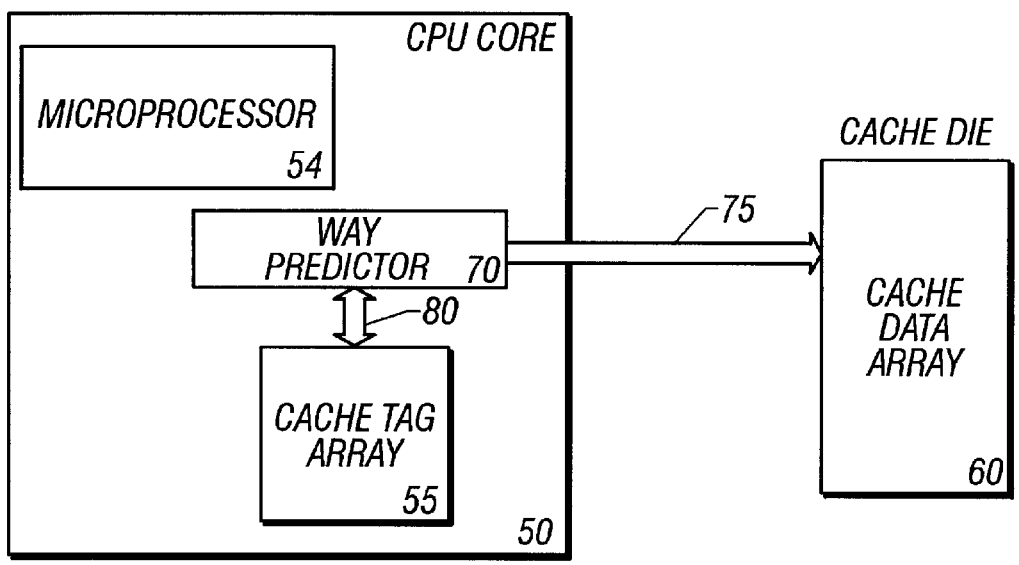
FIG. 4 is a block diagram of the cache memory architecture with a way predictor in accordance with the method and system of the present invention.

Referring now to FIG. 4, a cache memory architecture with a way predictor 70 in accordance with the present invention is illustrated. The way predictor 70 further improves the performance of the cache memory architecture depicted in FIG. 3. As illustrated, the cache tag array 55 resides on the central processing unit (CPU) core (i.e. the microprocessor chip) 50. The cache tag array 55 is coupled to the way predictor 70 by an internal bus 80. The way predictor 70 is further coupled to the cache data array 60 by an external bus 75, with the cache data array 60 residing off (i.e. external to) the CPU core 50.

The way predictor 70 improves the performance of the cache memory by predicting, with relatively high precision, a hit or a miss even before the cache tag array 55 lookup can be completed. In general, the way prediction of the way predictor 70 completes in fewer clock cycles than the cache tag array 55 lookup. The way predictor 70 is particularly useful when the cache tag array 55 reports a hit. By correctly predicting a hit even before it is confirmed by the cache tag array 55, the way predictor 70 is able to reduce the cache latency by issuing an early way select signal to the remote (i.e. off the CPU core) data array 60 to access the requested data. Since a cache hit entails transferring data over the external bus 75, an early, yet accurate prediction by the way predictor 70 improves the performance of the cache memory.

Those skilled in the art will appreciate that the way predictor 70 is adaptable to a variety of cache memory systems. It can be implemented in a single- or a multi-level cache system, where the cache system may include a direct mapped cache, an n-way set associative cache, or both types of caches. Furthermore, the cache system may also employ a MESI cache protocol, a least-recently used (LRU) algorithm, a pseudo-LRU algorithm, or any combination thereof. Thus, it should be apparent to one skilled in the art that the way predictor 70 can be implemented in various cache memory architectures.

Figure 5:
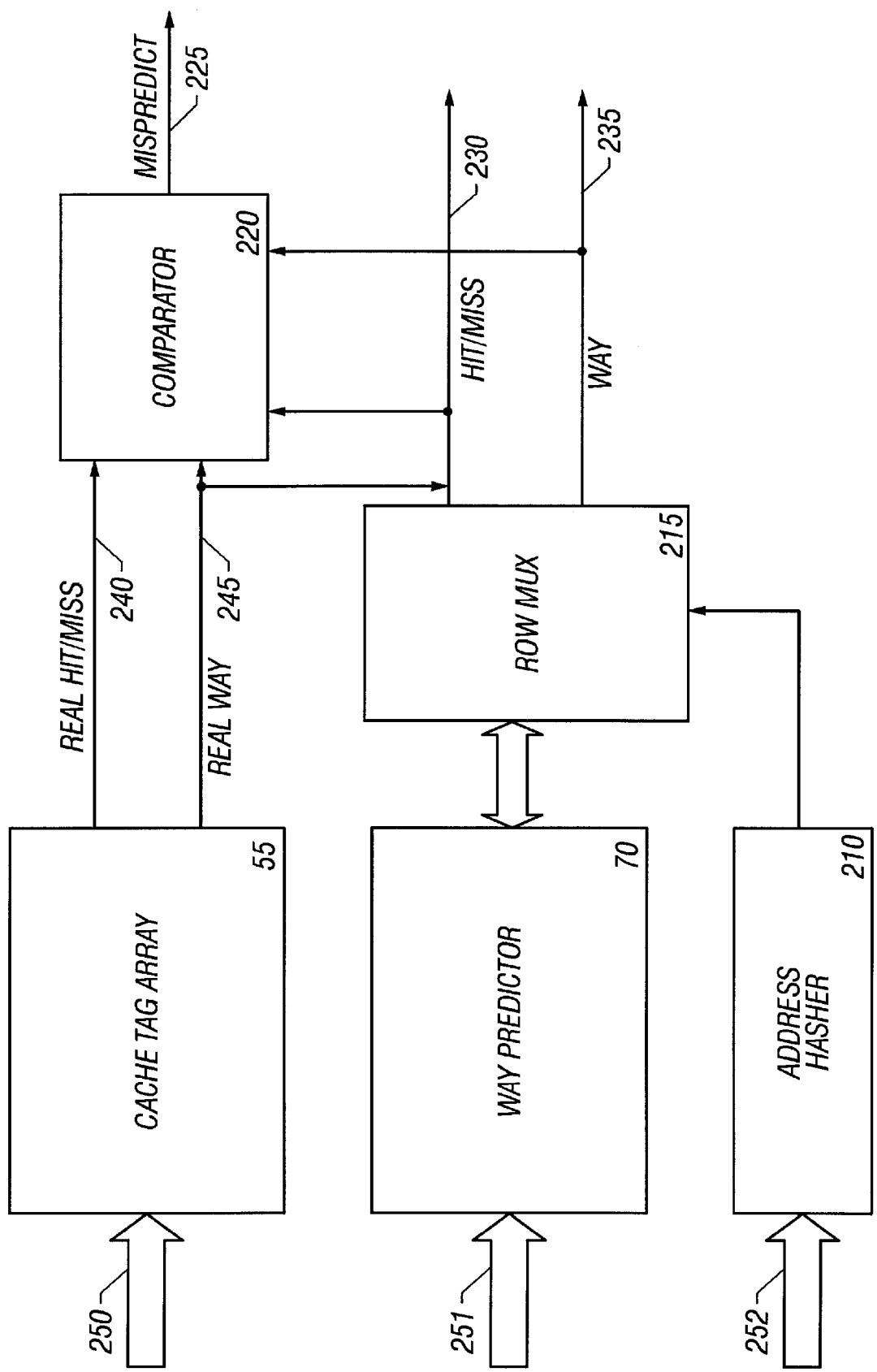
FIG. 5 is a block diagram of a cache tag array and a way predictor in accordance with the method and system of the present invention.

FIG. 5 illustrates a block diagram of a cache tag array 55 and a way predictor 70 in accordance with the method and system of the present invention. As shown, the block diagram includes a cache tag array 55, a way predictor 70, and an address hasher 210, which are provided with some or all of the physical address bits 250–252 of the requested data. The cache tag array 55 is coupled to a comparator 220. The way predictor 70 is coupled to a row multiplexer 215, which is further coupled to the address hasher 210. A predicted hit/miss signal 230 and a way selector signal 235 from the row multiplexer 215 are input into the comparator 220. A real hit/miss signal 240 and a real way selector signal 245 from the cache tag array 55 are also input into the comparator 220. The comparator 220 compares the input signals 230, 240; 235, 245 and then outputs a mispredict signal 225. The mispredict signal 225 is available to the cache tag array 55 as well as to other bus controllers (not shown). The comparator 220, row multiplexer 215, and the address hasher 210 are well-known to an ordinary person skilled in the art and will not be discussed in detail here.

The way predictor 70 consists of an array containing X number of rows and Y number of columns (i.e. a history/prediction table). Typically, the total number of entries in the way predictor 70 should equal the total number of cache lines in the cache tag array 55, although it is possible to have more entries in the way predictor 70. Each column entry of the history table contains a hit/miss bit and way (or bank) selection bits. The hit/miss bit identifies whether a particular information resides in the cache data array (not shown), and if so, the way selection bits identify the way (or bank) in which the information is stored. The number of way selection bits required depends on the number of banks present in the cache tag array 55. For example, in a 16-way set associative cache, there are sixteen banks, which means four binary digits are required to identify the sixteen cache banks. In summary, the way predictor history table contains information that not only identifies whether a particular data resides in the cache data array (not shown) but also its location.

The entries in the way predictor 70 are arranged using physical addresses, similar to the address scheme utilized by the cache tag array 55. Each way-predictor row is addressed in a similar manner as the lines of the cache tag array 55, where the lower physical address bits (or a portion thereof) are used for row selection. For example, in a system utilizing forty-four bits for physical addressing, bits nine through seventeen can be utilized for row selection. Once a row has been selected, the full row of Y entries is read into the row multiplexer 215, which then selects the correct entry based on the output of the address hasher 210.

The address hasher 210 generates an output signal (i.e. hashing bits) by hashing the upper bits of the physical address. As an example, a sixteen-to-four address hasher can be utilized, which uses sixteen physical address bits to generate four hash address bits. The size of the way predictor history table will dictate the number of hash bits required. Thus, the number of physical address digits that have to be hashed to produce the desired number of hash bits will depend on the size of the way predictor history table to be implemented.

Because the entries from the way predictor history table are selected based on the hashing of only the upper physical address bits, it is possible for the way predictor 70 to predict a cache hit or miss incorrectly. The number of mispredictions, however, can be reduced by increasing the number of entries in the history table. But the increased size of the history table would not only slow the way predictor lookup, it will also require additional storage space and hash bits. Thus, the optimal size and specific implementation of the way predictor 70 will depend on the particular system configuration in which it is implemented.

The entries in the history table are updated by selecting the row and column addresses of the way predictor 70. When the cache tag array 55 is modified, it propagates that information to the way predictor 70 as well. The history table thus not only contains the hit/miss information but also the way/bank information. The history table is also updated after the way predictor 70 mispredicts. Overall, the way predictor 70 is updated after a new cache line fill, a snoop hit, a cache line access, and a misprediction.

Figure 6:
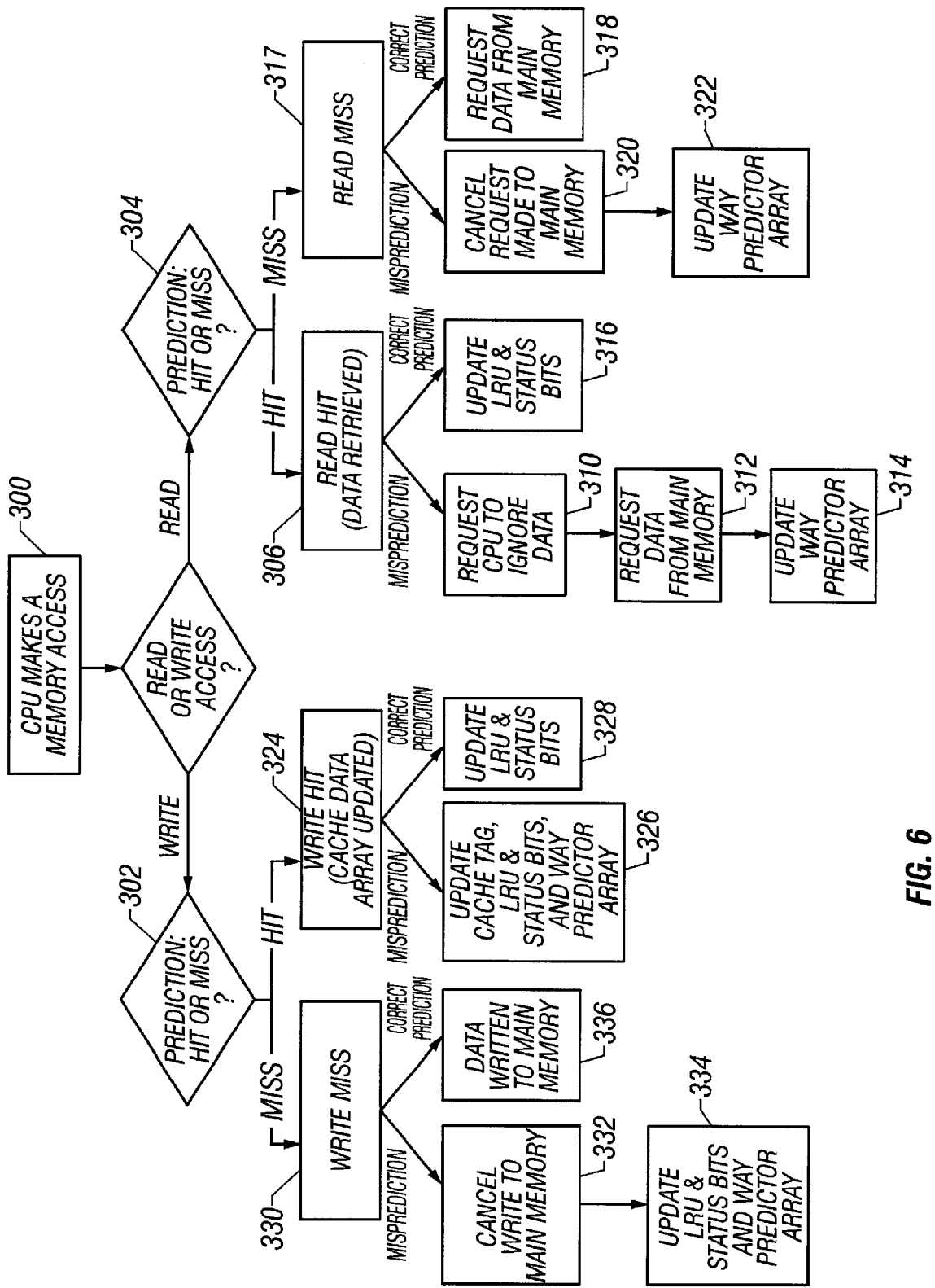
FIG. 6 is a flow chart illustrating the operation of the way predictor in accordance with the method and system of the present invention.

A flow chart illustrating the operation of the way predictor 70 in accordance with the method and system of the present invention is shown in FIG. 6. At block 300 the microprocessor 54 initiates either a cache memory read or write access. In either case, the microprocessor 54 provides the physical main memory address of the requested information to the cache tag array 60 as well as to the way predictor 70. At blocks 302, 304 the way predictor 70, based on its history table, quickly predicts whether the information resides in the cache data array 60. As mentioned earlier, the way predictor 70 lookup is faster than the cache tag array 55 lookup.

If at block 304 the way predictor 70 predicts a hit on a cache read, then at block 306, it immediately forwards the way signal to the data array 60, and fetches the corresponding data. While the data is in route over the backside bus, the cache tag array 55 completes its lookup and returns a real hit or a miss. The real hit or miss signal is then compared with the predicted hit signal. If the way predictor 70 mispredicted, then at blocks 310, 312, 314 the information retrieved by the way predictor 70 is discarded, the way predictor 70 history table is updated, and In the missed data is requested from the main memory. If, however, the way predictor 70 correctly predicted a hit, then at block 306 the retrieved information is available to the microprocessor 54 before or at approximately the same time the cache tag array 55 lookup completes. The least recently used (LRU) and MESI status bits in the cache tag array 55 are updated at block 316 when the way predictor 70 predicts correctly.

The method described above is also applicable when at block 304, 317 the way predictor 70 predicts a miss on a cache read. If the way predictor 70 predicts a miss, at block 317 the request is forwarded to the main memory over the front side bus. If the way predictor 70 mispredicts a miss, then at blocks 320, 322 the request for information from the main memory is canceled and the way predictor history table is updated. If the prediction was correct, then at block 318 the retrieved data is provided to the microprocessor before or at approximately the same time the cache tag array 55 lookup completes.

If at block 302 the way predictor 70 predicts a hit on a cache write, then at block 324 it immediately writes the contents to the cache data array. While the cache data array is in the process of being updated, the cache tag array returns with a real hit or a miss. The real hit or miss signal is then compared with the predicted hit signal. In case of a misprediction, at block 326 the cache tag array, the LRU and the MESI status bits, as well as the way predictor history table is updated to reflect the contents of the cache data array. If, however, the prediction was correct, then at block 324 the write transaction completes before or at approximately the same time that the cache tag array 55 lookup completes. The least-recently used (LRU) and MESI status bits in the cache tag array 55 are also updated when at block 328 the way predictor 70 correctly predicts a write hit. It should be noted that on a cache write, the way predictor 70 need not be used since the cache write will happen once a hit on the cache tag array 55 is confirmed. If there is no hit on the cache tag array 55, the cycle is forwarded to the front side bus controller. To reduce latency on a cache write, a way predictor 70 can be used.

If at block 302 the way predictor 70 predicts a miss on a cache write, the request is forwarded to the main memory (not shown) over the front side bus (not shown). If at block 330 the way predictor 70 mispredicts a write miss, then at block 332 the front side bus controller (not shown) cancels the request to retrieve the data from the main memory (not shown) and then updates the LRU and MESI status bits and the way predictor 70 at block 334. Thus, the write miss request never reaches the main memory (not shown). If, however, the way predictor 70 predicted correctly at block 330, then at block 336 the data is directly written to the main memory while the cache tag array 55 lookup completes.

Figure 7:
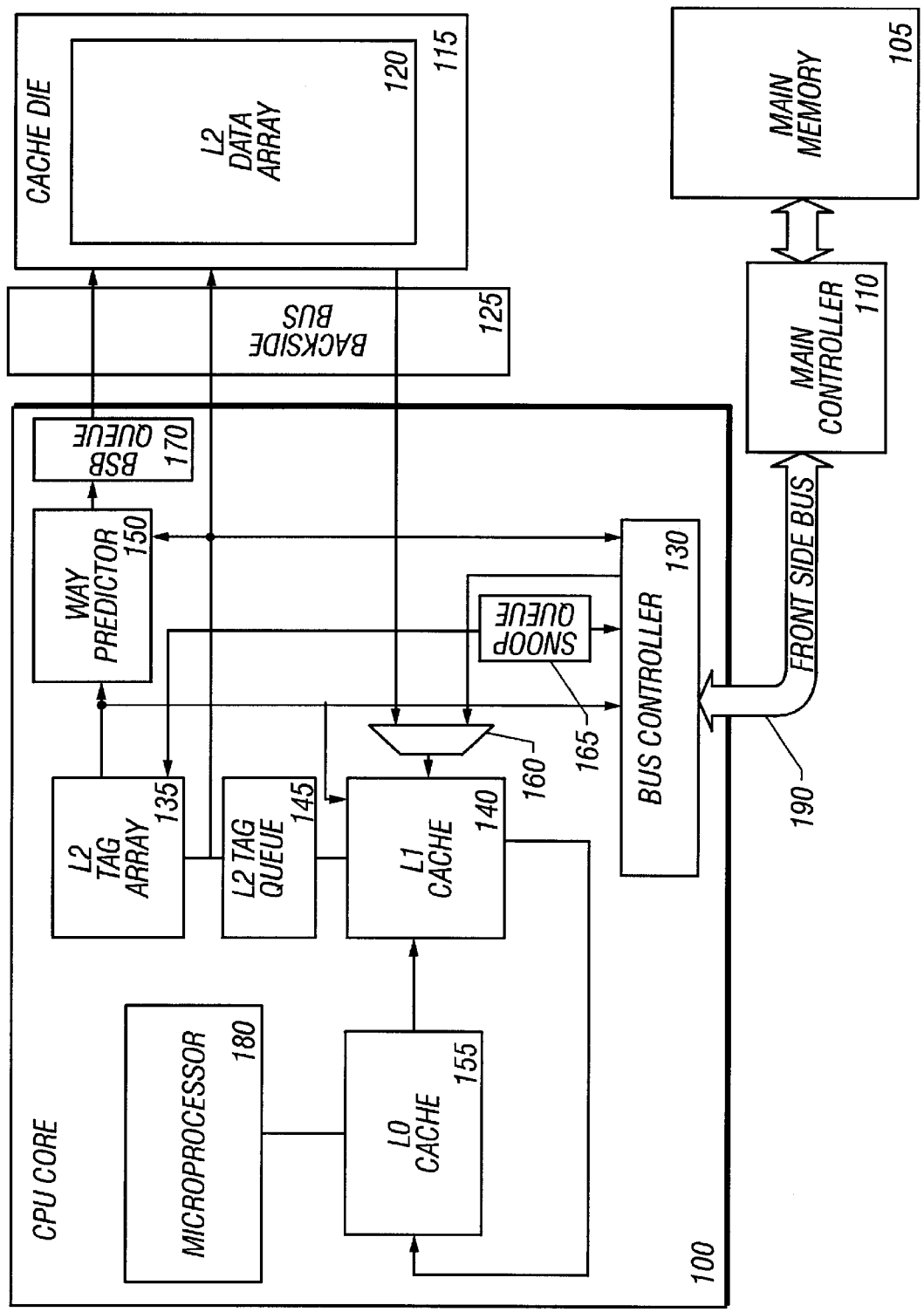
FIG. 7 is a block diagram of an embodiment of the present invention.

Referring now to FIG. 7, there is depicted an embodiment of the present invention, which includes a CPU core 100, a main memory 105, a memory controller 110, a cache die 115, an L2 data array 120, a backside bus 125, a bus controller 130, an L2 tag array 135, an L1 cache 140, an L2 tag queue 145, a backside bus (BSB) queue 170, a way predictor 150, an L0 cache 155, a multiplexer 160, a snoop queue 165, and a microprocessor 180. The L2 tag queue 145 and BSB queue 170 store and sequentially process the requests from the L1 cache 140 and the way predictor 150, respectively. The snoop queue 165 queues the snoop requests submitted by the bus controller 130.

FIG. 7 illustrates a three-level pipelined cache memory architecture with the way predictor 150, where the first level cache, L0, 155, the second level cache, L1, 140, and the tag array 135 of the third level cache, L2, reside on the CPU core 100. The L2 cache data array 120 is off the CPU core 100, and is resident on the cache die 115. The L2 data array 120 is coupled to the CPU core 100 by a backside bus 125. The main memory 105 is coupled to the memory controller 110, which is also coupled to the bus controller 130 over the front side bus 190.

A microprocessor 180 on the CPU core 100 presents an address to the first level cache, L0, 155. If the requested data is present in the L0 cache 155, it is sent to the microprocessor 180. If, however, the data is not present, then the request is forwarded to the L1 cache 140. Likewise, if the L1 cache 140 reports a miss, then the request is forwarded to the L2 tag array 135 as well as the way predictor 150. While the L2 tag array 135 is in the process of determining whether the requested data is present in the L2 data array 120, the way predictor 150 predicts with a relatively high precision whether the data indeed resides in the L2 data array 120. If the way predictor 150 predicts a cache hit, then it will request the data from the L2 data array 120, which will then forward it over the backside bus 125. Thus, the way predictor 150 is able to "prefetch" the requested data even before the L2 tag array 135 issues a request to retrieve the data from the L2 data array 120, thereby improving the cache access time.

While the way predictor 150 is designed to predict accurately, it is possible that the predictions may sometimes be inaccurate. That is, it is possible for the way predictor 150 to predict a hit and fetch the corresponding data from the L2 data array 120, while the L2 tag array 135 reports a miss. If this occurs, the incorrect data requested by the way predictor 150 is discarded and, instead, the process is then forwarded to the memory controller 110 over the front side bus 190. The memory controller 110 then fetches the data from the main memory 105 and provides it to the L0 cache 155, L1 cache 140, the L2 data array 120, as well as the microprocessor 180.

As mentioned earlier, the purpose of the way predictor 150 is to improve the cache memory access time. Although the purpose of a way predictor remains the same, there are various ways to implement a way predictor within a data processing system. For example, it is possible to implement a way predictor to predict only cache reads, and not cache writes. Alternatively, the way predictor can predict both cache reads and writes, but retrieves data only if it predicts a cache read or write hit, otherwise, it waits for the cache lookup to complete. An optimal implementation of the way predictor in a particular data processing system will depend on that system's memory architecture and what the system designer hopes to accomplish. The way predictor utilized in the cache memory architecture depicted in FIG. 7, for example, predicts only cache memory reads. This is because the number of additional cycles needed to correct a write misprediction in this particular three-level cache system proves to be more costly than the time saved as a result of the correct predictions.

One advantage of having the L2 tag array 135 on the CPU core 100 is that the number of cycles required for a cache lookup are reduced, which means a fewer number of pipeline stages are required to implement the three-level cache system of FIG. 7. It takes longer to access a cache tag array that is off-chip (i.e. not on the CPU core) because the request has to be transmitted over an external bus. Thus, the on-chip L2 tag array 135 eliminates the input/output and board delays associated with an off-chip lookup, thereby improving the effective cache latency of the system.

Another advantage of the cache memory architecture of the present invention is that it allows concurrent execution of memory accesses. This is because the new cache architecture includes an L2 tag queue 145 in addition to the existing BSB queue 170. The L2 tag and BSB queues 145, 170 work concurrently, where the L2 tag queue 145 processes requests made to the L2 tag array 135 and the BSB queue 170 processes requests made to the L2 data array 120. Thus, it is conceivable that while the L2 data array 120 is providing data to the L1 cache 140 in response to a request from the BSB queue 170, the L2 tag 135 is concurrently performing a lookup in response to a request from the L2 tag queue 145. This concurrent memory transaction would not be possible if the both the L2 tag and data array 135, 120 were off-chip, and serviced by only one queue, the BSB queue 170. With an L2 tag array 135 off-chip, the memory requests from a BSB queue 170 would be processed serially, where the L2 tag array 170 would first perform a lookup and, in case of a cache hit, then retrieve the data from the L2 data array 120.

Yet another advantage of placing the L2 tag array 135 on the CPU core 100 is that it allows for a faster front side snoop. Snooping, which is well-known in the art, is a method by which a processor ensures that it is dealing with the freshest copy of the information. The bus controller 130 includes the snooping logic (not shown), which ensures that the contents of caches, L0 155 and L1 140, as well as that of L2 data array 120 are coherent with that of the main memory 105. To maintain coherency, the snooping logic (not shown) queries the caches L0 155 and L1 140, and L2 tag array 135 in response to external snoop requests. Because the L2 tag array 135 resides on the CPU core 100 according to the cache memory architecture of the present invention, the L2 tag array 135 can be accessed quicker, which makes it possible to complete the snoop cycle faster. The on-chip L2 tag array 135 can be accessed faster in the present invention because the delays associated with an off-chip lookup are eliminated.

It will be appreciated by those of ordinary skill in the art having the benefit of this disclosure that numerous variations from the foregoing illustration will be possible without departing from the inventive concept described herein. Accordingly, it is the claims set forth below, and not merely the foregoing illustration, which are intended to define the exclusive rights of the invention.

What is claimed is:

1. A method, comprising:

providing a read address to a cache memory to request read data;

providing the read address to a way predictor to predict a hit or a miss based on a history table;

if the hit is correctly predicted, completing the request to cache memory and updating status bits in the cache memory if the hit is incorrectly predicted, ignoring the request to cache memory, requesting the read data from main memory, and updating the way predictor;

if the miss is correctly predicted, reading the read data from main memory; and if the miss is incorrectly predicted, canceling a read request to main memory, and updating the way predictor.

2. The method of claim 1, further comprising:

completing the prediction before the hit or miss is determined.

3. The method of claim 1, further comprising:

if the hit is incorrectly predicted, discarding data returned from the cache memory in response to the read request to cache memory.

4. The method of claim 1, wherein providing a read address includes providing an address to an address hasher.

5. A method comprising:

providing a write address to a cache memory to request a writing of data;

providing the write address to a way predictor to predict a hit or a miss based on a history table;

if the hit is correctly predicted, completing the request to cache memory and updating status bits in the cache memory;

if the hit is incorrectly predicted updating a cache tag array, updating the status bits, and updating the way predictor;

if the miss is correctly predicted, writing the data to a main memory; and if the miss is incorrectly predicted, canceling a write request to the main memory and updating the way predictor and the status bits.

6. The method of claim 5, further comprising:

completing the prediction before the hit or miss is determined.

7. The method of claim 5, further comprising:

if the hit is incorrectly predicted, writing the data to the main memory.

8. The method of claim 5, wherein providing a write address includes providing an address to an address hasher.

9. The system of claim 8, further comprising logic to:

complete the prediction before the hit or miss is determined.

10. The system of claim 8, further comprising logic to:

if the hit is incorrectly predicted, discard data returned from the cache memory in response to the read request to cache memory.

11. A data processing system, comprising:

a central processing unit;

a way predictor coupled to the central processing unit and having a history table to predict a cache hit or a cache miss;

a tag array of a cache memory, the tag array coupled to the central processing unit;

a data array of the cache memory, the data array coupled to the tag array; and logic to:

provide a read address to the cache memory to request read data;

provide the read address to a way predictor to predict the hit or miss based on a history table;

if the hit is correctly predicted, complete the request to cache memory and update status bits in the cache memory;

if the hit is incorrectly predicted, ignore the request to cache memory, request the read data from main memory, and update the way predictor;

if the miss is correctly predicted, read the read data from main memory; and if the miss is incorrectly predicted, cancel a read request to main memory and update the way predictor.

12. The data processing system of claim 11, further comprising:

an address hasher;

a multiplexer coupled to the address hasher and the way predictor; and a comparator coupled to the multiplexer and the tag array.

13. The data processing system of claim 12, wherein the multiplexor has a first output to provide a hit/miss prediction signal and a second output to provide a way prediction signal.

14. The data processing system of claim 13, wherein the comparator is to compare a real hit/miss signal from the tag array with the hit/miss prediction signal and a real way signal from the tag array with the way prediction signal.

15. A data processing system, comprising:

a central processing unit;

a way predictor coupled to the central processing unit and having a history table to predict a cache hit or a cache miss;

a tag array of a cache memory, the tag array coupled to the central processing unit;

a data array of the cache memory, the data array coupled to the tag array; and logic to:

provide a write address to the cache memory to request a writing of data;

provide the write address to a way predictor to predict the hit or miss based on a history table;

if the hit is correctly predicted, complete the request to cache memory and update status bits in the cache memory;

if the hit is incorrectly predicted, update a cache tag array, update the status bits, and update the way predictor;

if the miss is correctly predicted, write the data to a main memory; and if the miss is incorrectly predicted, cancel a write request to the main memory and update the way predictor and the status bits.

16. The system of claim 15, further comprising logic to:

complete the prediction before the hit or miss is determined.

17. The system of claim 15, further comprising logic to:

if the hit is incorrectly predicted, cancel writing the data to main memory.

* * * * *